US010925066B2

(12) United States Patent
Davydov et al.

(10) Patent No.: US 10,925,066 B2
(45) Date of Patent: Feb. 16, 2021

(54) QUASI CO-LOCATION (QCL) FOR ANTENNA PORTS IN NEW RADIO (NR)

(71) Applicant: APPLE INC., Cupertino, CA (US)

(72) Inventors: Alexei Davydov, Nizhny Novgorod (RU); Dae Won Lee, Portland, OR (US); Gang Xiong, Portland, OR (US); Yushu Zhang, Beijing (CN); Wook Bong Lee, Pleasanton, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/479,556

(22) PCT Filed: May 4, 2018

(86) PCT No.: PCT/US2018/031249
§ 371 (c)(1),
(2) Date: Jul. 19, 2019

(87) PCT Pub. No.: WO2018/204882
PCT Pub. Date: Nov. 8, 2018

(65) Prior Publication Data
US 2019/0364556 A1 Nov. 28, 2019

Related U.S. Application Data

(60) Provisional application No. 62/516,992, filed on Jun. 8, 2017, provisional application No. 62/501,880, filed on May 5, 2017.

(51) Int. Cl.
*H04W 72/04* (2009.01)
*H04B 7/08* (2006.01)
(Continued)

(52) U.S. Cl.
CPC .......... *H04W 72/048* (2013.01); *H04B 7/088* (2013.01); *H04L 5/0023* (2013.01);
(Continued)

(58) Field of Classification Search
CPC .... H04L 5/0048; H04W 8/005; H04W 76/28; H04W 68/005; H04W 76/18;
(Continued)

(56) References Cited

U.S. PATENT DOCUMENTS

| | | | |
|---|---|---|---|
| 2017/0105112 A1* | 4/2017 | Park | H04W 8/005 |
| 2018/0270792 A1* | 9/2018 | Park | H04W 76/28 |
| 2018/0279218 A1* | 9/2018 | Park | H04W 36/08 |

OTHER PUBLICATIONS

R1-1705975; 3GPP TSG RAN WG1#88 bis; Title: On QCL Framework and Configurations in NR; Agenda Item: 8.1.2.4.5; Source: Nokia; Apr. 3-7, 2017; Spokane USA.

* cited by examiner

*Primary Examiner* — Jung Liu

(57) ABSTRACT

Technology for a user equipment (UE) operable for quasi-co-location (QCL) is disclosed. The UE can demodulate a synchronization signal (SS) block transmitted by a gNB from a first antenna port, wherein one or more of a Doppler shift, a Doppler spread, an average delay, a delay spread, and spatial receiving parameters are derived from the SS block. The UE can decode a QCL indication that provides an assumption of QCL between a first reference signal of the first antenna port and a second reference signal of a second antenna port. The UE can demodulate the physical channel or the reference signal transmitted by the gNB from the second antenna port, using one or more of the Doppler shift, the Doppler spread, the average delay, the delay spread, and the spatial receiving parameters based on the assumption of QCL.

21 Claims, 14 Drawing Sheets

(51) Int. Cl.
*H04L 5/00* (2006.01)
*H04W 56/00* (2009.01)
*H04W 72/02* (2009.01)

(52) U.S. Cl.
CPC ......... *H04L 5/0051* (2013.01); *H04W 56/001* (2013.01); *H04W 72/02* (2013.01); *H04W 72/0446* (2013.01)

(58) Field of Classification Search
CPC ... H04W 68/025; H04W 68/04; H04W 76/27; H04J 11/0069
See application file for complete search history.

U.S. 10,925,066 B2

QUASI CO-LOCATION (QCL) FOR ANTENNA PORTS IN NEW RADIO (NR)

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB) or next generation node Bs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

and

Figure 12:
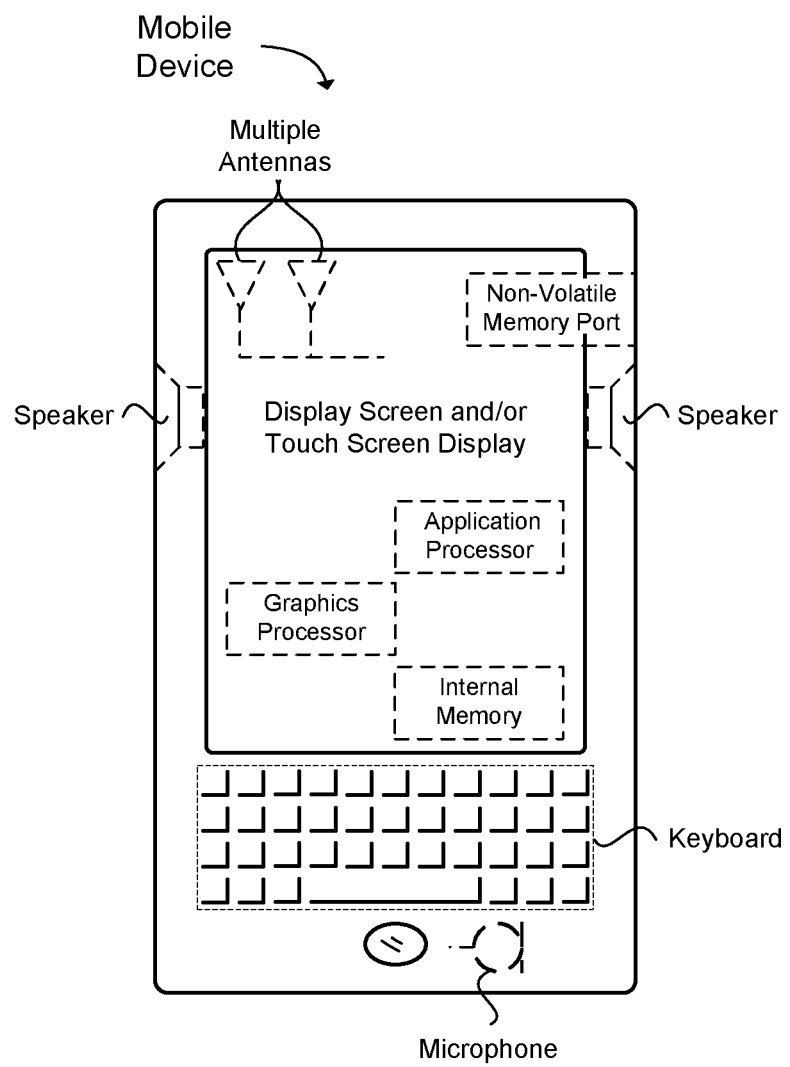

FIG. 12 illustrates a diagram of a wireless device (e.g., UE) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Two antenna ports can be quasi co-located if the large-scale properties of the channel over which a symbol on one antenna port is conveyed can be inferred from the large-scale properties of the channel over which a symbol on the other antenna port is conveyed. The large-scale properties of the channel can include one or more of: average delay, delay spread, Doppler shift, Doppler spread, and average gain.

Various quasi co-location assumptions can be supported in order to enable more efficient processing at a user equipment (UE). In one example, the antenna port of a synchronization signal (SS) block can be quasi co-located with the antenna port of the demodulation reference signal (DM-RS) corresponding to a common control channel transmitted using multiple beams. In another example, the antenna port of a SS block can be quasi co-located with the antenna port of the UE-specific channel state information reference signal (CSI-RS) used for beam management procedures. In another example, a quasi co-location assumption can be supported for antenna ports transmitted in different bandwidth parts.

Figure 1:
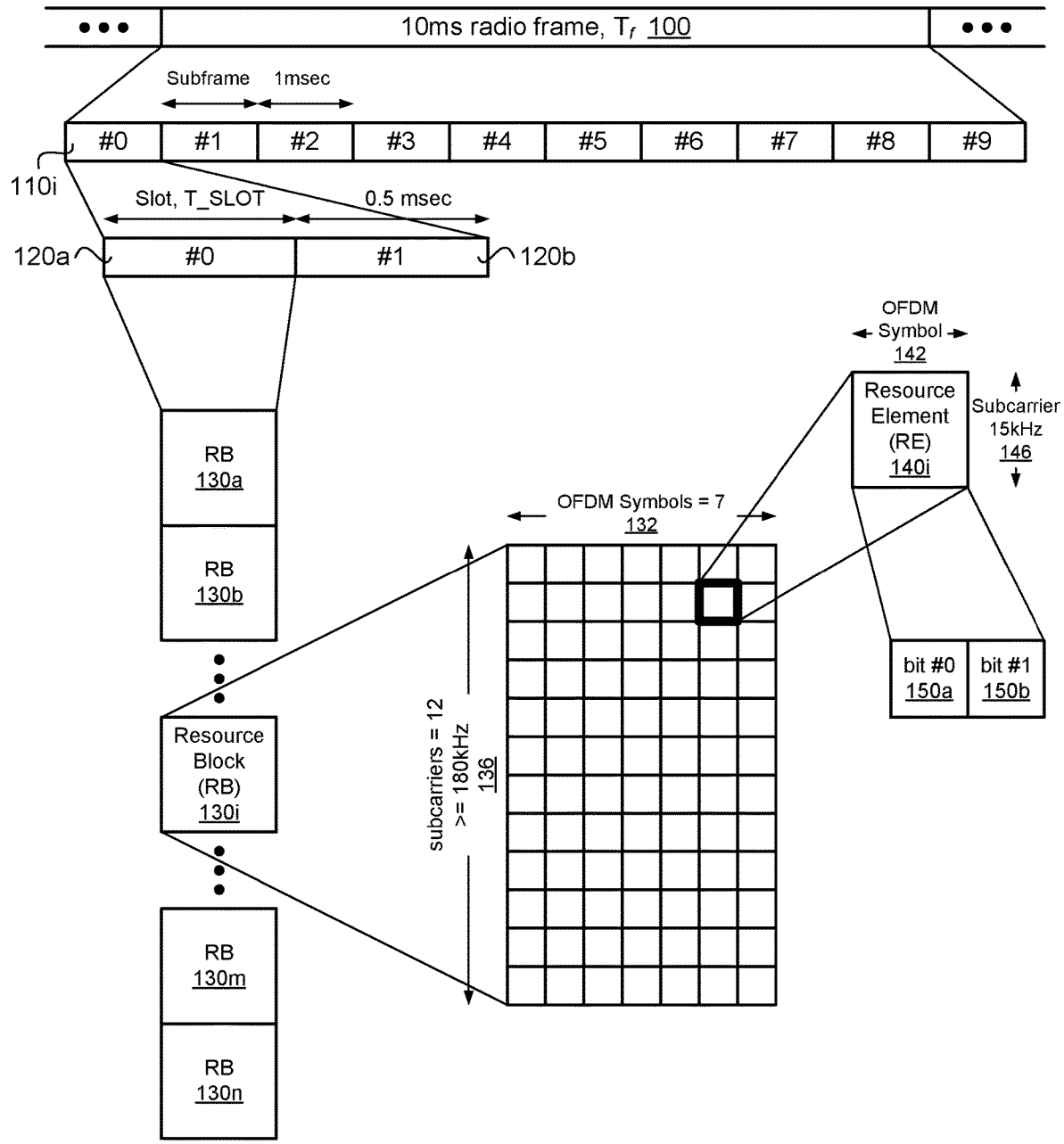
FIG. 1 illustrates a block diagram of an orthogonal frequency division multiple access (OFDMA) frame structure in accordance with an example.

FIG. 1 provides an example of a 3GPP LTE Release 8 frame structure. In particular, FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into two slots 120a and 120b, each with a duration, $T_{slot}$, of 0.5 ms. The first slot (#0) 120a can include a legacy physical downlink control channel (PDCCH) 160 and/or a physical downlink shared channel (PDSCH) 166, and the second slot (#1) 120b can include data transmitted using the PDSCH.

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI)

found in the legacy PDCCH. The legacy PDCCH in the control region can include one to three columns of the first Orthogonal Frequency Division Multiplexing (OFDM) symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130$i$ can include 12-15 kilohertz (kHz) subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP LTE Release 8 frame structure provides examples of the way in which data is transmitted, or the transmission mode. The example is not intended to be limiting. Many of the Release 8 features will evolve and change in 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband) 204, mMTC (massive Machine Type Communications or massive IoT) 202 and URLLC (Ultra Reliable Low Latency Communications or Critical Communications) 206. The carrier in a 5G system can be above or below 6 GHz. In one embodiment, each network service can have a different numerology.

QCL for Antenna Ports

The antenna port can be used for transmission of a physical channel or signal. The antenna port can be defined so that the channel over which a symbol on the antenna port is conveyed can be inferred from the channel over which another symbol on the same antenna port is conveyed. Different antenna ports can correspond to different reference signals, which can be used for channel estimation and processing of the physical channel transmitted on the same antenna ports. Antenna ports that correspond to different reference signals may be located at the same location, or different locations. Each channel of a signal from differently located antenna ports can have substantially different large scale properties due to the different location, different distance from a UE, different signal paths, and so forth. However, antenna ports that are located at different locations may still have similar large scale properties if the distance between the ports is not substantial. These antenna ports can be assumed to have the same large scale properties. They are referred to as being quasi co-located. Two antenna ports can be quasi co-located if the large-scale properties of the channel over which a symbol on one antenna port is conveyed can be inferred from the large-scale properties of the channel over which a symbol on the other antenna port is conveyed.

The large-scale properties of the channel can include one or more of: average delay, delay spread, Doppler shift, Doppler spread, and average gain. The average delay can include the first-order statistics for the time property of a channel. The delay spread can include the second-order statistics for the time property of the channel. The Doppler shift can include the first-order statistics for the frequency properties of a channel. The Doppler spread can include the second-order statistics for the frequency properties of a channel. The average gain can include the first-order statistics for the amplitude properties of the channel. The large-scale properties estimated on antenna ports of reference signals can be used to parametrize the channel estimator and compensate for possible time and frequency errors when deriving channel state information (CSI) feedback or when performing demodulation.

New Radio (NR) antenna design is primarily based on the antenna sub-array concept. According to this concept, the physical antenna elements of the transmission receive point (TRP) (e.g. a next generation node B (gNB)) or user equipment (UE) can be grouped into antenna sub-arrays in which each antenna array can include multiple sub-arrays. Also, the physical antenna elements of the antenna sub-array can be virtualized to the one or more antenna ports using analog beamforming.

The analog beamforming can be used to improve the performance of the communication link between the TRP and the UE. The analog beamforming at the TRP and the UE can be trained by transmitting a series of the reference signals with different beamforming. The UE can also train the receive beamforming. The optimal analog beamforming at the UE can depend on the beamforming at the TRP, and the optimal analog beamforming at the TRP can depend on the beamforming at the UE. One or more optimal transmission (Tx)/reception (Rx) beam combinations at the TRP and the UE can be established for possible communication. In one example, an optimal Tx beam on one antenna subarray can be reused on another antenna subarray. In this example, the optimal Rx beam at the UE can be the same. The reference signals transmitted on an antenna port with the same beam, using the same or different panels, can be quasi co-located with each other with respect to the spatial channel parameters, e.g., mean angle of arrival and angle of arrival spread.

Figure 2A:
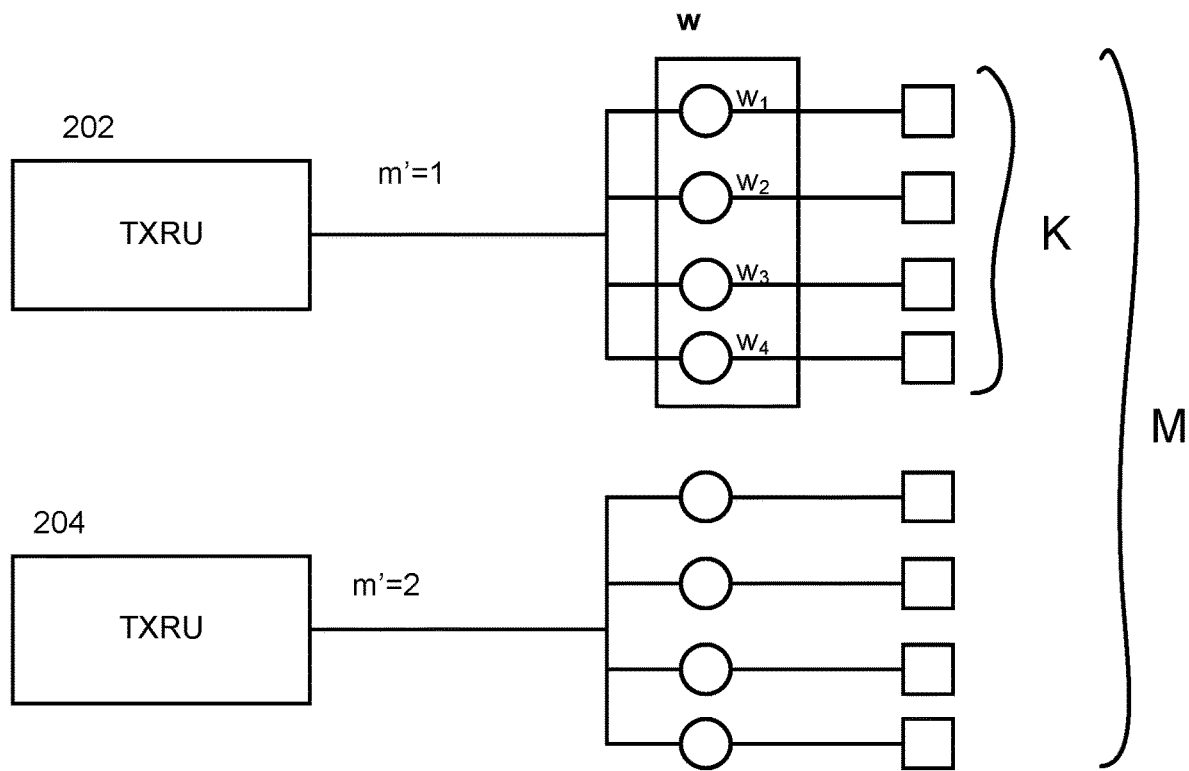
FIG. 2a illustrates sub-array antenna architecture in accordance with an example.

In another example, as illustrated in FIG. 2$a$, a sub-array antenna architecture can have two sub-arrays in which each sub-array can have different analog beamforming. In this example, a transceiver unit (TXRU) 202 can include K antenna elements, wherein K is a positive integer, e.g., 4. Each of the K antenna elements can include an antenna weight w, e.g., $w_1$, $w_2$, $w_3$, and $w_4$. The analog beamforming can be controlled by the antenna weights w, e.g., $w_1$, $w_2$, $w_3$, and $w_4$ for the m'=1 sub-array. In this example, a TXRU 204 can include K antenna elements, wherein K is a positive integer, e.g., 4. Each of the K antenna elements can include an antenna weight w, e.g., $w_5$, $w_6$, $w_7$, and $w_8$. The analog beamforming can be controlled by the antenna weights w, e.g., $w_5$, $w_6$, $w_7$, and $w_8$ for the m'=2 sub-array. The K antenna elements in the TXRU 202 and TXRU 204 can include a total of M antenna elements, e.g., 8. The example of FIG. 2*a* is not intended to be limiting. The total number of antenna elements can depend on system design. For example, M can be 4, 8, 16, 32, 48, 64, 96, 128 and so forth. A larger number of antenna elements can provide beams that can be directed with a finer angular granularity.

Figure 2B:
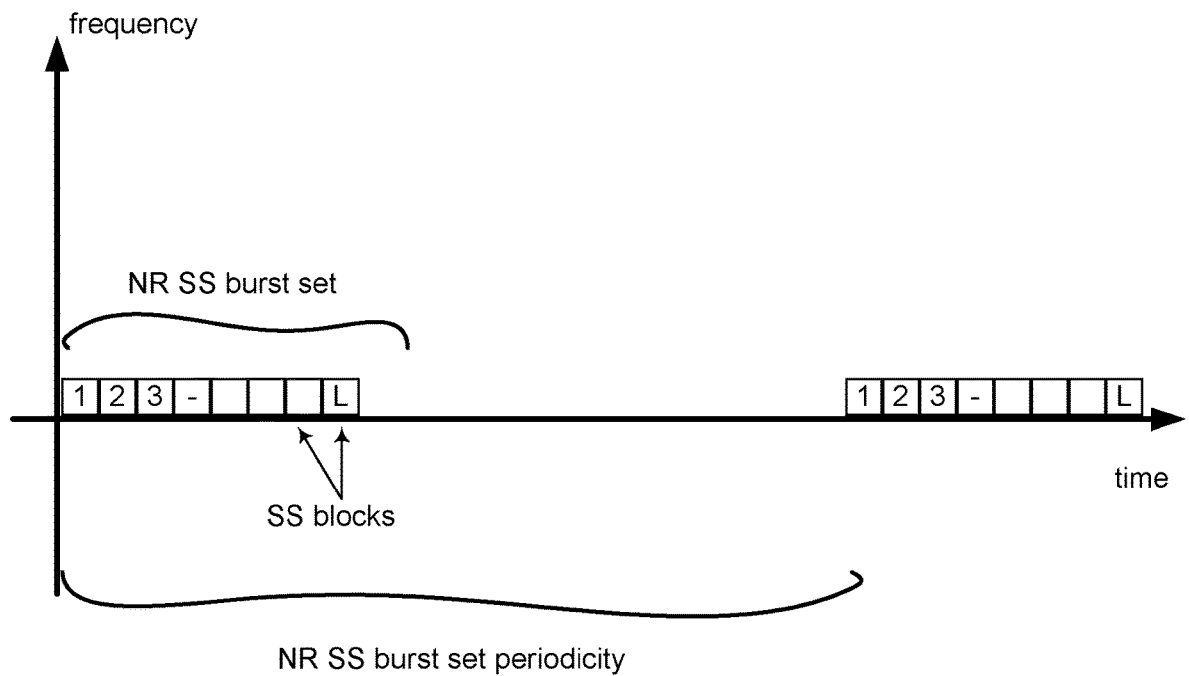
FIG. 2b illustrates synchronization signal (SS) transmission in accordance with an example.

Synchronization signals (SSs) in NR can be transmitted using one or more SS blocks organized into SS burst sets. In another example, as illustrated in FIG. 2*b*, the SS burst set can include SS blocks 1, 2, 3, . . . , L, where L is a positive integer. In the time domain, the SS burst set can have a SS burst set periodicity, which can be the period between iterations of the SS burst set.

Figure 2C:
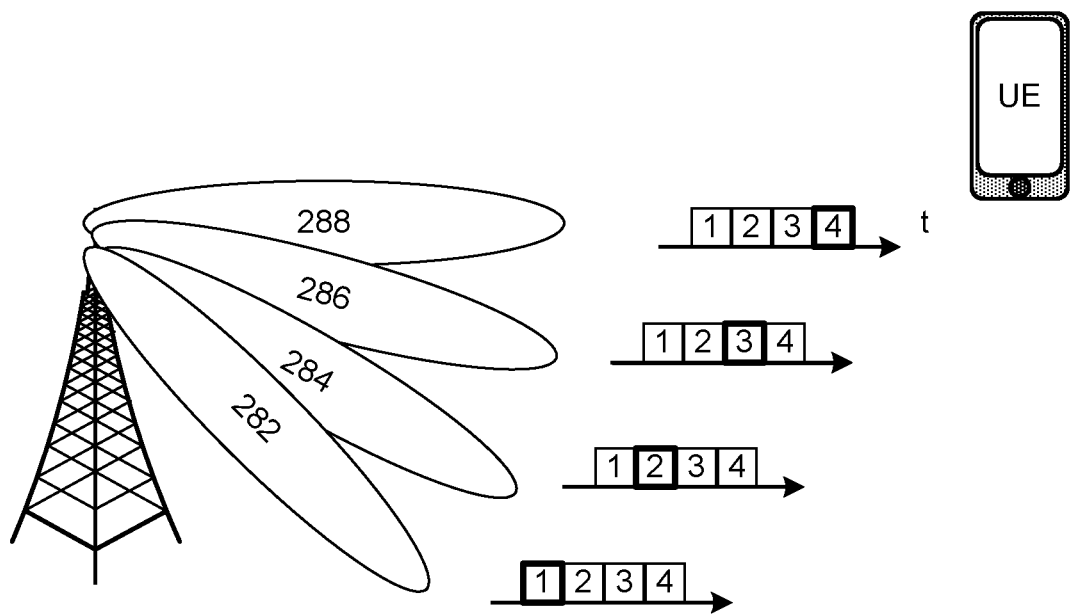
FIG. 2c illustrates beam assignment for different synchronization signal (SS) blocks in accordance with an example.

One of the purposes of transmitting multiple SS blocks can be to enable Tx beamforming for each individual SS block transmitted by the next generation node B (gNB). In another example, as illustrated in FIG. 2*c*, each SS block can be assigned to a specific beam. In this example, SS block 1 can be assigned to the beam 282. In this example, SS block 2 can be assigned to the beam 284. In this example, SS block 3 can be assigned to the beam 286. In this example, SS block 4 can be assigned to the beam 288. Upon detection of the specific SS blocks, the UE can acquire Tx/Rx beam information that can be used for transmission of the other physical channels and reference signals.

Figure 3:
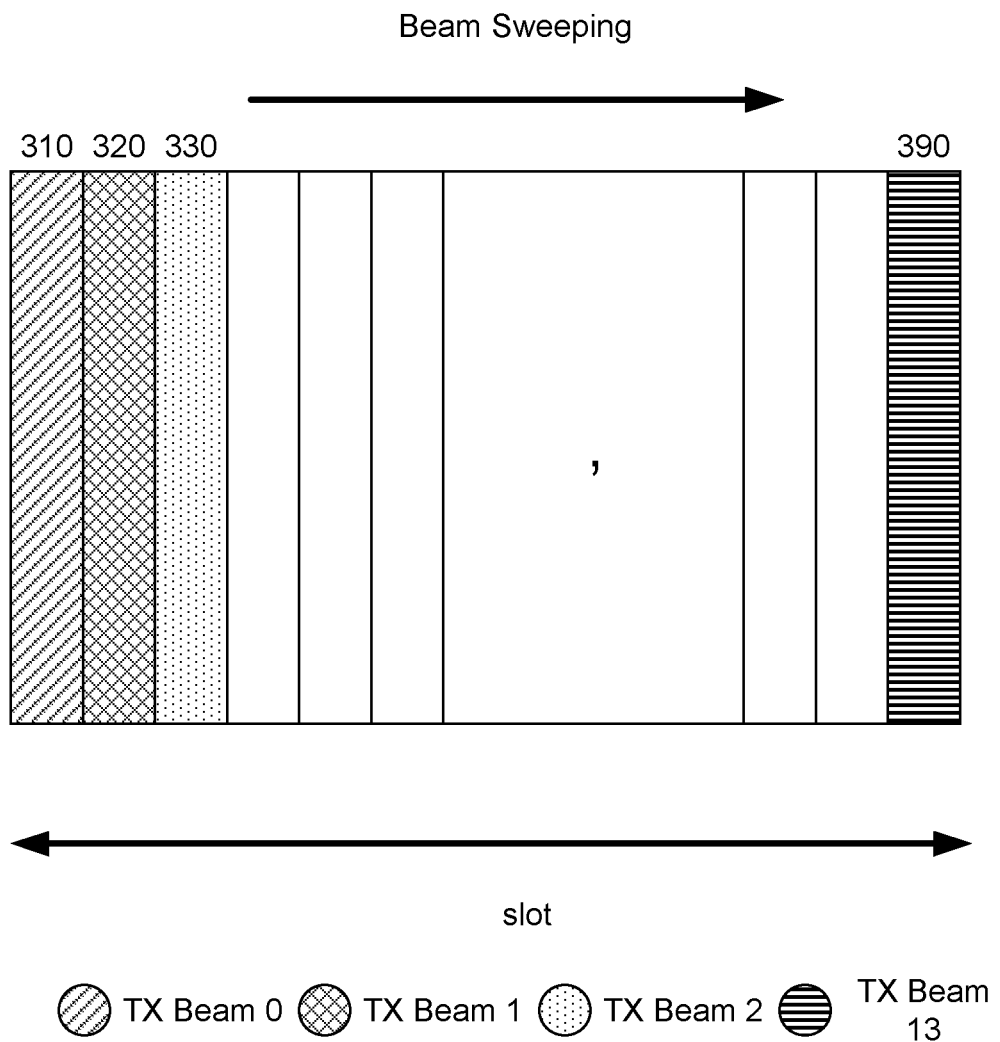
FIG. 3 illustrates beam sweeping in accordance with an example.

In another example, as illustrated in FIG. 3, in the case of multiple beam operation, beam sweeping can be performed for the transmission of common control messages. In this example, one beam can be applied on each symbol or group of symbols within one slot. In this example, Tx beam 0 can be applied on each symbol or set of symbols in 310. In this example, Tx beam 1 can be applied on each symbol or set of symbols in 320. In this example, Tx beam 2 can be applied on each symbol or set of symbols in 330. In this example, Tx beam 13 can be applied on each symbol or set of symbols in 390. When a gNB is equipped with multiple antenna arrays or panels, multiple beams can be formed in each symbol.

In another example, the common control channel can be used to transmit UE-specific control information to the UE. The reception of the common control channel can also depend on beamforming at the UE. In order to avoid a separate UE Rx beam training procedure at the UE, a quasi co-location (QCL) assumption can be established for the one or more antenna ports of an SS block and the one or more demodulation reference signal (DM-RS) antenna ports of the common control channel. The quasi co-location between the one or more antenna ports of an SS block and the one or more demodulation reference signal (DM-RS) antenna ports of the common control channel can be established with respect to spatial parameters at the receiver, e.g., mean angle of arrival and angle or arrival spread. In this example, the Rx beam acquired by the UE on the SS block can be reused to process the corresponding symbol or set of symbols of the common control channel. The quasi co-location between the one or more antenna ports of an SS block and the one or more demodulation reference signal (DM-RS) antenna ports of the common control channel can be established with respect to average delay and Doppler shift as well. In this example, the time and frequency offsets estimated by the UE on one SS block can be reused to process the demodulation of the associated symbol or set of symbols of the common control channel.

In another example, the Tx beam acquired by the UE on the SS block can be reused for the beam Tx refinement procedure. In this example, the acquired beam can be used as a reference for Tx beam refinement. The refinement of the Tx beam at the gNB may be used when the beamforming on the SS block depends on wider beams. In this example, narrow beams can be trained by the gNB within the angular area covered by the acquired wider beam.

Figure 4:
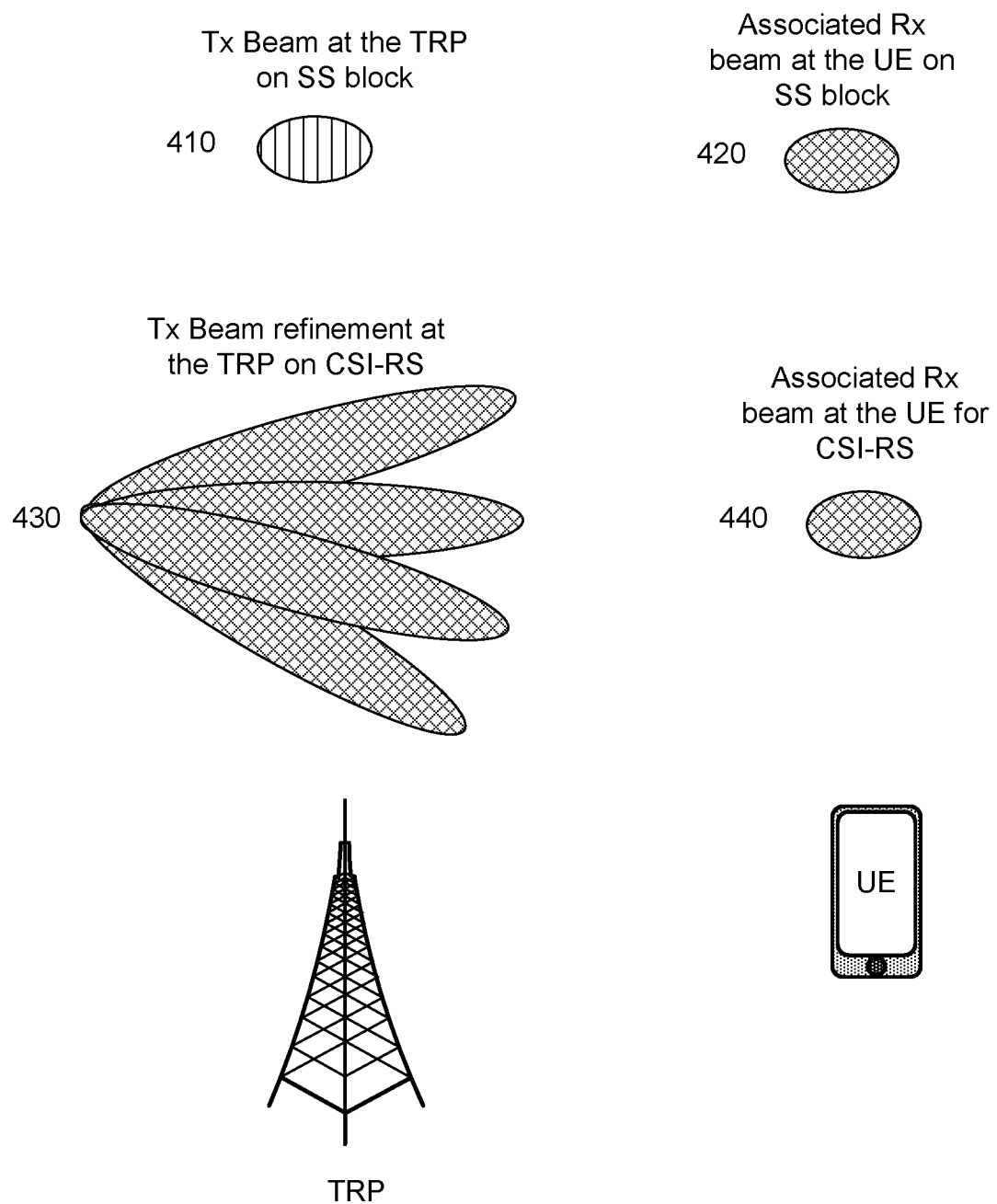
FIG. 4 illustrates beam refinement at the next generation node B (gNB) in accordance with an example.

In another example, as illustrated in FIG. 4, to facilitate Tx beam refinement, a UE-specific channel state information reference signal (CSI-RS) can be used in which the serving gNB can apply different beams for transmission of the CSI-RS. The UE during this beam refinement procedure can assume that some Rx beams can be aligned with the Tx beam acquired by the UE during an SS block reception. As such, quasi co-location between the one or more antenna ports of the SS block and the one or more antenna ports of the CSI-RS can be established. Under this QCL assumption, the UE can tune the Rx beam according to the Tx beam of the SS block.

In this example, the Tx Beam at the TRP on the SS block is provided by the hatching indicated for 410. The associated Rx beam at the UE on the SS block is provided by the hatching indicated for 420. The hatching associated with 410 differs from the hatching indicated for 420. The Tx beam refinement at the TRP for CSI-RS is provided by the hatching indicated for 430. The associated Rx beam at the UE for the CSI-RS is provided by the hatching indicated for 440. The hatching for 420, 430, and 440 are all identical in this example, and the hatching for 420, 430, and 440 each differ from the hatching for 410.

In another example, a secondary synchronization signal (SSS) can be transmitted by a gNB from an antenna port that is used to transmit an SS block. In another example, control information can be transmitted on a physical broadcast channel (PBCH) by a gNB from an antenna port that is used to transmit the SS block. In another example, a primary synchronization signal (PSS) can be transmitted by a gNB from an antenna port that is used to transmit an SS block.

In another example, common control information can be transmitted by the gNB in a physical channel from a second antenna port. Common control information can be transmitted using channels that are available to a plurality of UEs. For example, system information block 1 (SIB1) for physical downlink shared channel (PDSCH) and broadcasting and paging can be used. In another example, CSI-RS used for beam management or beam refinement can be transmitted by the gNB from a second antenna port. In another example, CSI-RS used for CSI-RS acquisition can be transmitted by the gNB from a second antenna port.

In another example, the UE can select a same receive beamforming to receive a signal transmitted from a second antenna port as the receive beamforming that is used to receive the SS block transmitted from a first antenna port. In another example, the UE can determine that the signal transmitted from the second antenna port has a same time and frequency offset as a time and frequency offset derived from the received SS block transmitted from the first antenna port.

QCL for Different BWPs

New Radio can be deployed with a large system bandwidth, which can be partitioned into one or more bandwidth parts (BWPs) in which each BWP has a specific configurable numerology. In one example, the specific configurable numerology can include subcarrier spacing and/or cyclic prefix duration. A UE can be configured with one or more BWPs for DL and one or more BWPs for UL for a provided time instance. Separate control signaling can be used to setup one or more DL BWPs and one or more UL BWPs. One or more DL BWPs and one or more UL BWPs can be setup via an Information Element (IE) sent via radio resource control (RRC) signaling.

In another example, when one DL BWP is active in a provided time instance, the physical downlink shared channel (PDSCH) and corresponding physical downlink control channel (PDCCH), in which the PDCCH can carry scheduling assignments of the PDSCH, can be transmitted within the same BWP. If PDSCH transmission starts later than K symbols, wherein K is a positive integer, after the end of the PDCCH transmission, then the physical downlink shared channel (PDSCH) and corresponding physical downlink control channel (PDCCH), in which the PDCCH can carry scheduling assignments of the PDSCH, may not be transmitted within the same BWP.

In another example, the active DL BWP and the active UL BWP can be indicated to a UE through explicit or implicit downlink control information (DCI), through medium access control (MAC) control element (CE), or through a time pattern, e.g., discontinuous reception (DRX).

Figure 5:
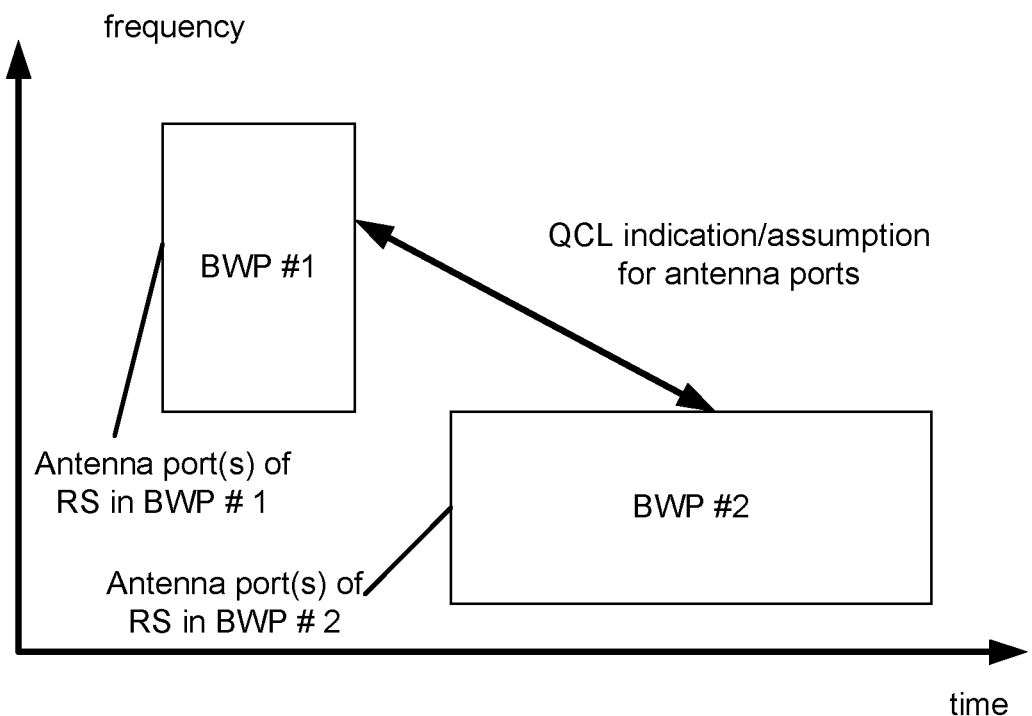
FIG. 5 illustrates bandwidth part (BWP) operation in accordance with an example.

In another example, as illustrated in FIG. 5, reference signals transmitted from the gNB using one or more antenna ports to the UE on different BWPs can be quasi co-located. In this example, BWP #1 can occupy a distinct time and frequency compared to BWP #2. The one or more antenna ports of BWP #1 can be distinct from the one or more antenna ports of BWP #2. Reference signals transmitted on BWP #1 and BWP #2 can be quasi co-located with respect to each other. BWP #1 and BWP #2 can overlap in the time domain and/or the frequency domain.

In another example, the one or more antenna ports of the same reference signals or of different reference signals can be transmitted in different BWPs. The one or more antenna ports of the same reference signals or of different reference signals transmitted in different BWPs can be non-quasi co-located with respect to the large-scale parameters (e.g., average delay, delay spread, Doppler shift, Doppler spread, average gain, and Rx spatial parameters) as a default assumption. Other assumptions about quasi co-location with respect to the one or more of the large-scale parameters can be indicated to the UE using DCI, MAC CE, or RRC signaling.

In another example, quasi co-location can be established between one or more DM-RS antenna ports transmitted on a first BWP and one or more DM-RS antenna ports transmitted on a second BWP. The set of BWPs for which quasi co-location is established between the one or more DM-RS antenna ports transmitted on a first BWP and the one or more DM-RS antenna ports transmitted on a second BWP can be indicated to the UE using physical layer signaling or higher layer signaling (e.g., RRC signaling).

In another example, quasi co-location can be established between one or more DM-RS antenna ports transmitted on a first BWP and beam reference signals transmitted on a second BWP. The QCL parameters can include Rx spatial parameters (e.g. mean angle of arrival, angle of arrival spread, or channel correlation). The QCL parameters can also include other QCL parameters such as average delay, delay spread, Doppler shift, Doppler spread, and average gain. DCI scheduling PDSCH and/or higher layer signaling (e.g., RRC signaling) can indicate to the UE that beam reference signals transmitted on one or more BWPs are quasi co-located with one or more DM-RS antenna ports transmitted on a first BWP.

In another example, quasi co-location can be established between one or more DM-RS antenna ports transmitted on a first BWP and one or more CSI-RS transmitted on a different set of BWPs. The QCL parameters can include Rx spatial parameters (e.g. mean angle of arrival, angle of arrival spread, or channel correlation). The QCL parameters can also include other QCL parameters such as average delay, delay spread, Doppler shift, Doppler spread, and average gain. DCI scheduling PDSCH and/or higher layer signaling (e.g., RRC signaling) can indicate to the UE that CSI-RS transmitted on one or more BWPs are quasi co-located with one or more DM-RS antenna ports transmitted on a first BWP. The beam reference signal can correspond to the SS block or CSI-RS configured for the UE for beam acquisition.

In another example, quasi co-location can be established between one or more CSI-RS antenna ports transmitted on a first BWP and one or more CSI-RS transmitted on a different set of BWPs. The QCL parameters can include Rx spatial parameters (e.g. mean angle of arrival, angle of arrival spread, or channel correlation). The QCL parameters can also include other QCL parameters such as average delay, delay spread, Doppler shift, Doppler spread, and average gain. DCI scheduling PDSCH and/or higher layer signaling (e.g., RRC signaling) can indicate to the UE that CSI-RS transmitted on one or more BWPs are quasi co-located with one or more CSI-RS antenna ports transmitted on a first BWP.

In another example, quasi co-location can be established between one or more mobility reference signal antenna ports transmitted on a first BWP and one or more reference signal types transmitted on a different set of BWPs. The reference signal types transmitted on the different set of BWPs can include CSI-RS, DM-RS, and beam reference signals. The QCL parameters can include Rx spatial parameters (e.g. mean angle of arrival, angle of arrival spread, or channel correlation). The QCL parameters can also include other QCL parameters such as average delay, delay spread, Doppler shift, Doppler spread, and average gain. DCI scheduling PDSCH and/or higher layer signaling (e.g., RRC signaling) can indicate to the UE that CSI-RS transmitted on one or more BWPs are quasi co-located with one or more CSI-RS antenna ports transmitted on a first BWP.

In another example, quasi co-location can be established between antenna ports of SS blocks (e.g. secondary synchronization signal) on a first BWP and antenna ports of a reference signal type transmitted on a different set of BWPs. The reference signal type transmitted on a different set of BWPs can include CSI-RS or DM-RS. The QCL parameters can include Rx spatial parameters (e.g. mean angle of arrival, angle of arrival spread, or channel correlation). The QCL parameters can also include other QCL parameters such as average delay, delay spread, Doppler shift, Doppler spread, and average gain. DCI scheduling PDSCH and/or higher layer signaling (e.g., RRC signaling) can indicate to the UE that CSI-RS transmitted on one or more BWPs are quasi co-located with one or more CSI-RS antenna ports transmitted on a first BWP.

Figure 6:
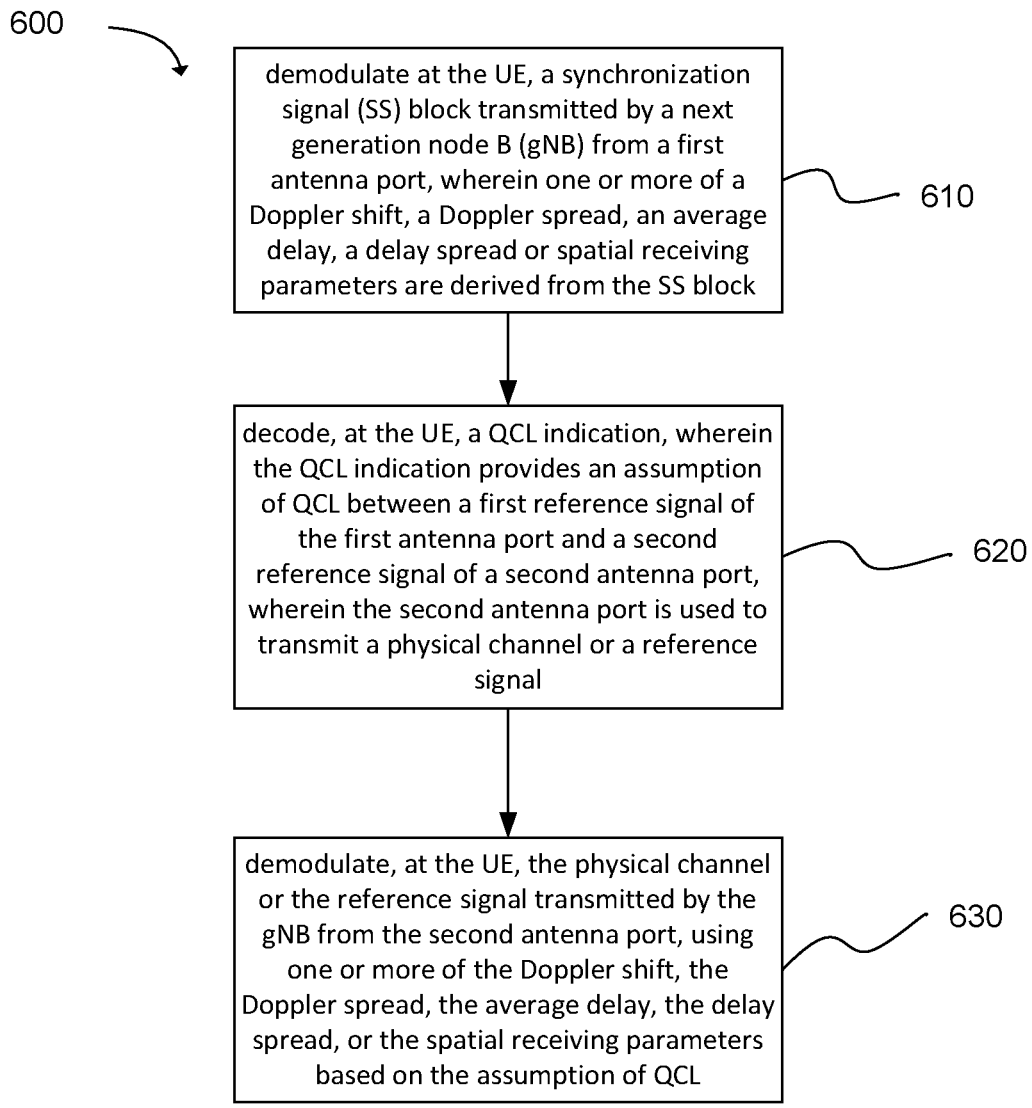
FIG. 6 depicts functionality of a user equipment (UE) operable for quasi-co-location (QCL) for antenna ports in accordance with an example.

Another example provides functionality 600 of a user equipment (UE) operable for quasi-co-location (QCL), as shown in FIG. 6. The UE can comprise one or more processors.

The one or more processors can be configured to demodulate at the UE, a synchronization signal (SS) block transmitted by a next generation node B (gNB) from a first antenna port, wherein one or more of a Doppler shift, a Doppler spread, an average delay, a delay spread, and spatial receiving parameters are derived from the SS block, as in block 610. The one or more processors can be configured to decode, at the UE, a QCL indication, wherein the QCL indication provides an assumption of QCL between a first reference signal of the first antenna port and a second reference signal of the second antenna port, wherein the second antenna port is used to transmit a physical channel or a reference signal, as in block 620. The one or more processors can be configured to demodulate, at the UE, the physical channel or the reference signal transmitted by the gNB from the second antenna port, using one or more of the Doppler shift, the Doppler spread, the average delay, the delay spread, and the spatial receiving parameters based on the assumption of QCL, as in block 630. In addition, the UE can comprise a memory interface configured to send the one or more of the Doppler shift, the Doppler spread, the average delay, the delay spread, or the spatial receiving parameters to a memory.

Figure 7:
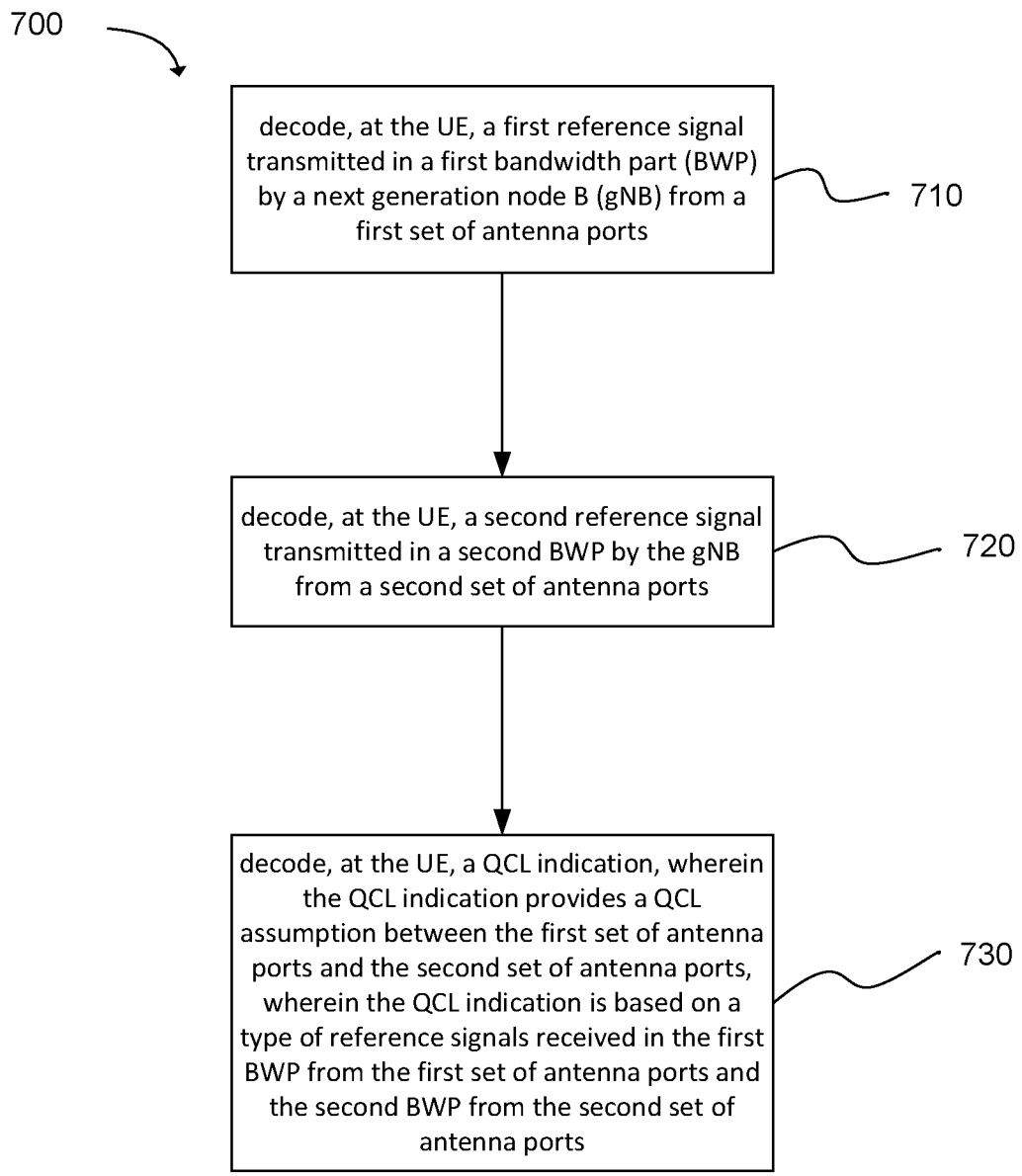
FIG. 7 depicts functionality of a user equipment (UE) operable for quasi-co-location (QCL) for antenna ports in accordance with an example.

Another example provides functionality 700 of a user equipment (UE) operable for quasi-co-location (QCL) for antenna ports, as shown in FIG. 7. The UE can comprise one or more processors. The one or more processors can be configured to decode, at the UE, a first reference signal transmitted in a first bandwidth part (BWP) by a next generation node B (gNB) from a first set of antenna ports, as in block 710. The one or more processors can be configured to decode, at the UE, a second reference signal transmitted in a second BWP by the gNB from a second set of antenna ports, as in block 720. The one or more processors can be configured to decode, at the UE, a QCL indication, wherein the QCL indication provides a QCL assumption between the first set of antenna ports and the second set of antenna ports, wherein the QCL indication is based on a type of reference signals received in the first BWP from the first set of antenna ports and the second BWP from the second set of antenna ports, as in block 730. In addition, the UE can comprise a memory interface configured to send the QCL indication to a memory.

Figure 8:
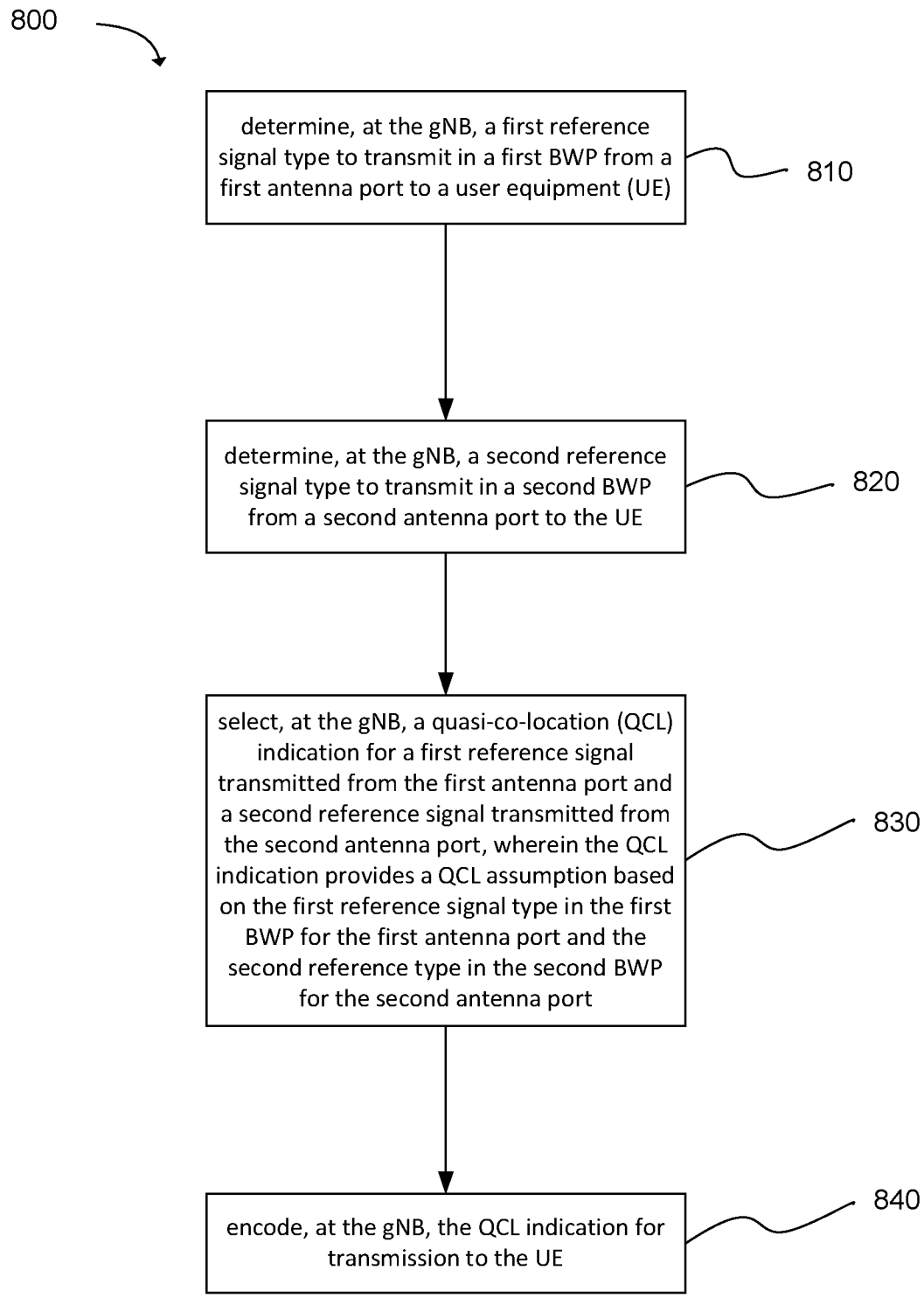
FIG. 8 depicts a functionality of a next generation node B (gNB) configured to transmit in bandwidth parts (BWPs) in accordance with an example.

Another example provides functionality 800 of a next generation node B (gNB) configured to transmit in bandwidth parts (BWPs), as shown in FIG. 8. The gNB can comprise one or more processors. The one or more processors can be configured to determine, at the gNB, a first reference signal type to transmit in a first BWP from a first antenna port to a user equipment (UE), as in block 810. The one or more processors can be configured to determine, at the gNB, a second reference signal type to transmit in a second BWP from a second antenna port to the UE, as in block 820. The one or more processors can be configured to select, at the gNB, a quasi-co-location (QCL) indication for a first reference signal transmitted from the first antenna port and a second reference signal transmitted from the second antenna port, wherein the QCL indication provides a QCL assumption based on the first reference signal type in the first BWP for the first antenna port and the second reference type in the second BWP for the second antenna port, as in block 830. The one or more processors can be configured to encode, at the gNB, the QCL indication for transmission to the UE, as in block 840. In addition, the gNB can comprise a memory interface configured to send the QCL indication to a memory.

While examples have been provided in which a gNB has been specified, they are not intended to be limiting. An evolved node B (eNodeB) can be used in place of the gNB. Accordingly, unless otherwise stated, any example herein in which a gNB has been disclosed, can similarly be disclosed with the use of an eNodeB.

Figure 9:
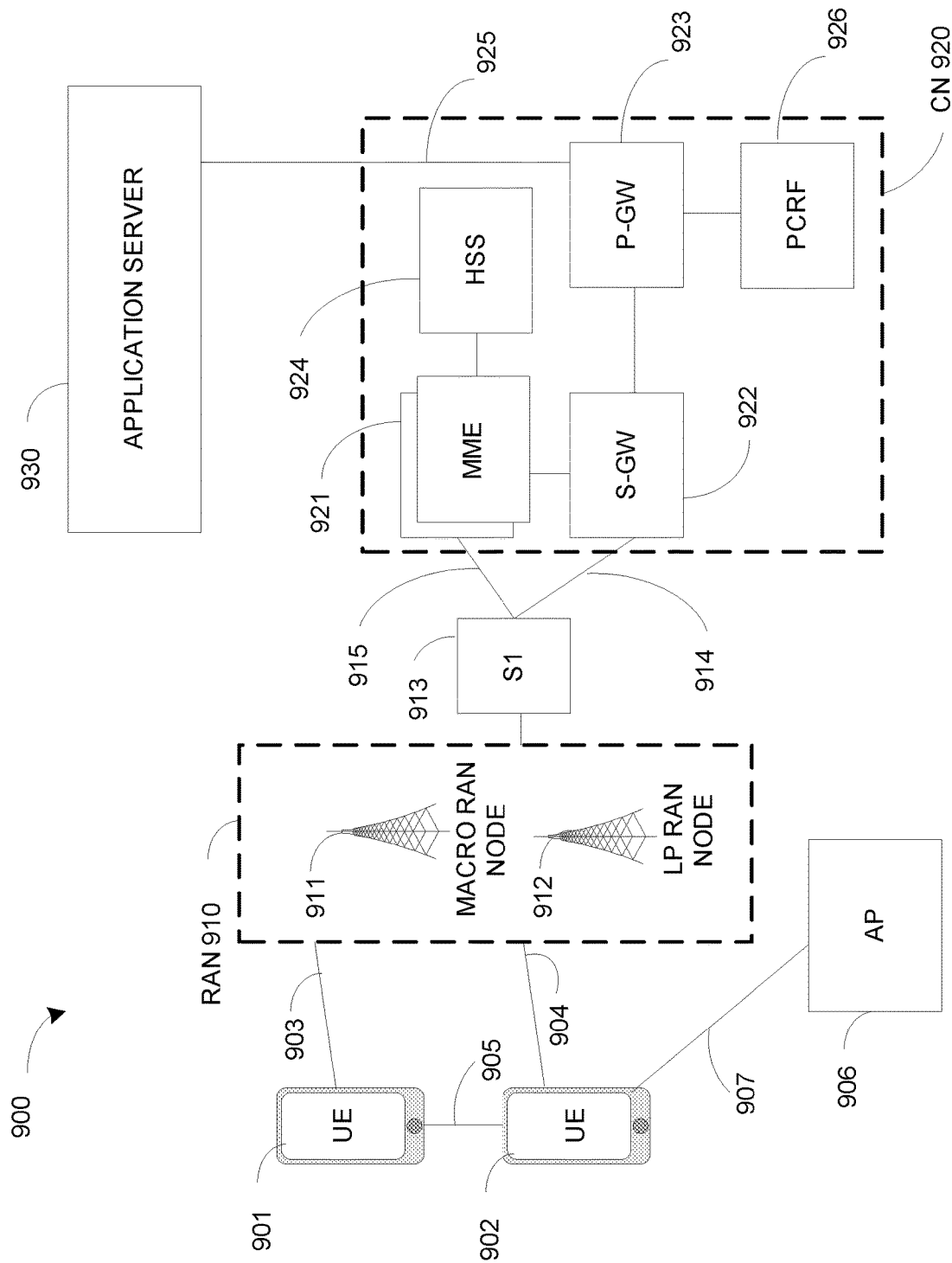
FIG. 9 illustrates an architecture of a wireless network in accordance with an example.

FIG. 9 illustrates an architecture of a system 900 of a network in accordance with some embodiments. The system 900 is shown to include a user equipment (UE) 901 and a UE 902. The UEs 901 and 902 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 901 and 902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 and 902 may be configured to connect, e.g., communicatively couple, with a radio access network (RAN) 910—the RAN 910 may be, for example, an Evolved Universal Mobile Telecommunications System (UMTS) Terrestrial Radio Access Network (E-UTRAN), a NextGen RAN (NG RAN), or some other type of RAN. The UEs 901 and 902 utilize connections 903 and 904, respectively, each of which comprises a physical communications interface or layer (discussed in further detail below); in this example, the connections 903 and 904 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 901 and 902 may further directly exchange communication data via a ProSe interface 905. The ProSe interface 905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 902 is shown to be configured to access an access point (AP) 906 via connection 907. The connection 907 can comprise a local wireless connection, such as a connection consistent with any IEEE 802.15 protocol, wherein the AP 906 would comprise a wireless fidelity (WiFi®) router. In this example, the AP 906 is shown to be connected to the Internet without connecting to the core network of the wireless system (described in further detail below).

The RAN 910 can include one or more access nodes that enable the connections 903 and 904. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 910 may include one or more RAN nodes for providing macrocells, e.g., macro RAN node 911, and one or more RAN nodes for providing femtocells or picocells (e.g., cells having smaller coverage areas, smaller user capacity, or higher bandwidth compared to macrocells), e.g., low power (LP) RAN node 912.

Any of the RAN nodes 911 and 912 can terminate the air interface protocol and can be the first point of contact for the UEs 901 and 902. In some embodiments, any of the RAN nodes 911 and 912 can fulfill various logical functions for the RAN 910 including, but not limited to, radio network controller (RNC) functions such as radio bearer management, uplink and downlink dynamic radio resource management and data packet scheduling, and mobility management.

In accordance with some embodiments, the UEs 901 and 902 can be configured to communicate using Orthogonal Frequency-Division Multiplexing (OFDM) communication signals with each other or with any of the RAN nodes 911 and 912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 and 912 to the UEs 901 and 902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 901 and 902. The physical downlink control channel (PDCCH) may carry information about the transport format and resource allocations related to the PDSCH channel, among other things. It may also inform the UEs 901 and 902 about the transport format, resource allocation, and H-ARQ (Hybrid Automatic Repeat Request) information related to the uplink shared channel. Typically, downlink scheduling (assigning control and shared channel resource blocks to the UE 902 within a cell) may be performed at any of the RAN nodes 911 and 912 based on channel quality information fed back from any of the UEs 901 and 902. The downlink resource assignment information may be sent on the PDCCH used for (e.g., assigned to) each of the UEs 901 and 902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 910 is shown to be communicatively coupled to a core network (CN) 920—via an S1 interface 913. In embodiments, the CN 920 may be an evolved packet core (EPC) network, a NextGen Packet Core (NPC) network, or some other type of CN. In this embodiment the S1 interface 913 is split into two parts: the S1-U interface 914, which carries traffic data between the RAN nodes 911 and 912 and the serving gateway (S-GW) 922, and the S1-mobility management entity (MME) interface 915, which is a signaling interface between the RAN nodes 911 and 912 and MMEs 921.

In this embodiment, the CN 920 comprises the MMEs 921, the S-GW 922, the Packet Data Network (PDN) Gateway (P-GW) 923, and a home subscriber server (HSS) 924. The MMEs 921 may be similar in function to the control plane of legacy Serving General Packet Radio Service (GPRS) Support Nodes (SGSN). The MMEs 921 may manage mobility aspects in access such as gateway selection and tracking area list management. The HSS 924 may comprise a database for network users, including subscription-related information to support the network entities' handling of communication sessions. The CN 920 may comprise one or several HSSs 924, depending on the number of mobile subscribers, on the capacity of the equipment, on the organization of the network, etc. For example, the HSS 924 can provide support for routing/roaming, authentication, authorization, naming/addressing resolution, location dependencies, etc.

The S-GW 922 may terminate the S1 interface 913 towards the RAN 910, and routes data packets between the RAN 910 and the CN 920. In addition, the S-GW 922 may be a local mobility anchor point for inter-RAN node handovers and also may provide an anchor for inter-3GPP mobility. Other responsibilities may include lawful intercept, charging, and some policy enforcement.

The P-GW 923 may terminate an SGi interface toward a PDN. The P-GW 923 may route data packets between the EPC network 923 and external networks such as a network including the application server 930 (alternatively referred to as application function (AF)) via an Internet Protocol (IP) interface 925. Generally, the application server 930 may be an element offering applications that use IP bearer resources with the core network (e.g., UMTS Packet Services (PS) domain, LTE PS data services, etc.). In this embodiment, the P-GW 923 is shown to be communicatively coupled to an application server 930 via an IP communications interface 925. The application server 930 can also be configured to support one or more communication services (e.g., Voice-over-Internet Protocol (VoIP) sessions, PTT sessions, group communication sessions, social networking services, etc.) for the UEs 901 and 902 via the CN 920.

The P-GW 923 may further be a node for policy enforcement and charging data collection. Policy and Charging Enforcement Function (PCRF) 926 is the policy and charging control element of the CN 920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 926 may be communicatively coupled to the application server 930 via the P-GW 923. The application server 930 may signal the PCRF 926 to indicate a new service flow and select the appropriate Quality of Service (QoS) and charging parameters. The PCRF 926 may provision this rule into a Policy and Charging Enforcement Function (PCEF) (not shown) with the appropriate traffic flow template (TFT) and QoS class of identifier (QCI), which commences the QoS and charging as specified by the application server 930.

Figure 10:
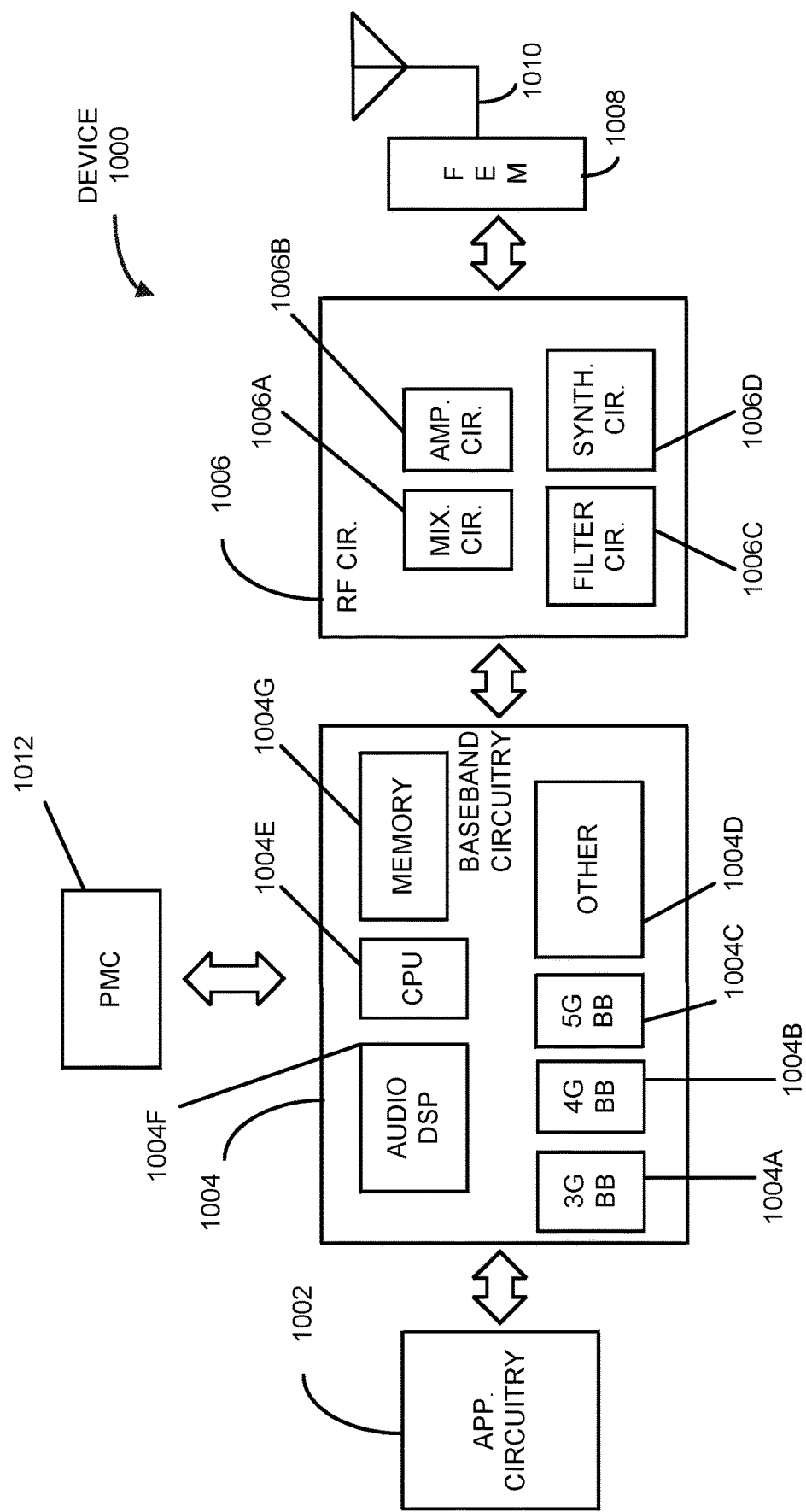
FIG. 10 illustrates a diagram of a wireless device (e.g., UE) in accordance with an example.

FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuit 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004$a$, a fourth generation (4G) baseband processor 1004$b$, a fifth generation (5G) baseband processor 1004$c$, or other baseband processor(s) 1004$d$ for other existing generations, generations in development or to be developed in the future (e.g., second generation (2G), sixth generation (6G), etc.). The baseband circuitry 1004 (e.g., one or more of baseband processors 1004$a$-$d$) may handle various radio control functions that enable communication with one or more radio networks via the RF circuitry 1006. In other embodiments, some or all of the functionality of baseband processors 1004$a$-$d$ may be included in modules stored in the memory 1004$g$ and executed via a Central Processing Unit (CPU) 1004$e$. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004$f$. The audio DSP(s) 1004$f$ may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a necessity. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a necessity. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 1012 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it can transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
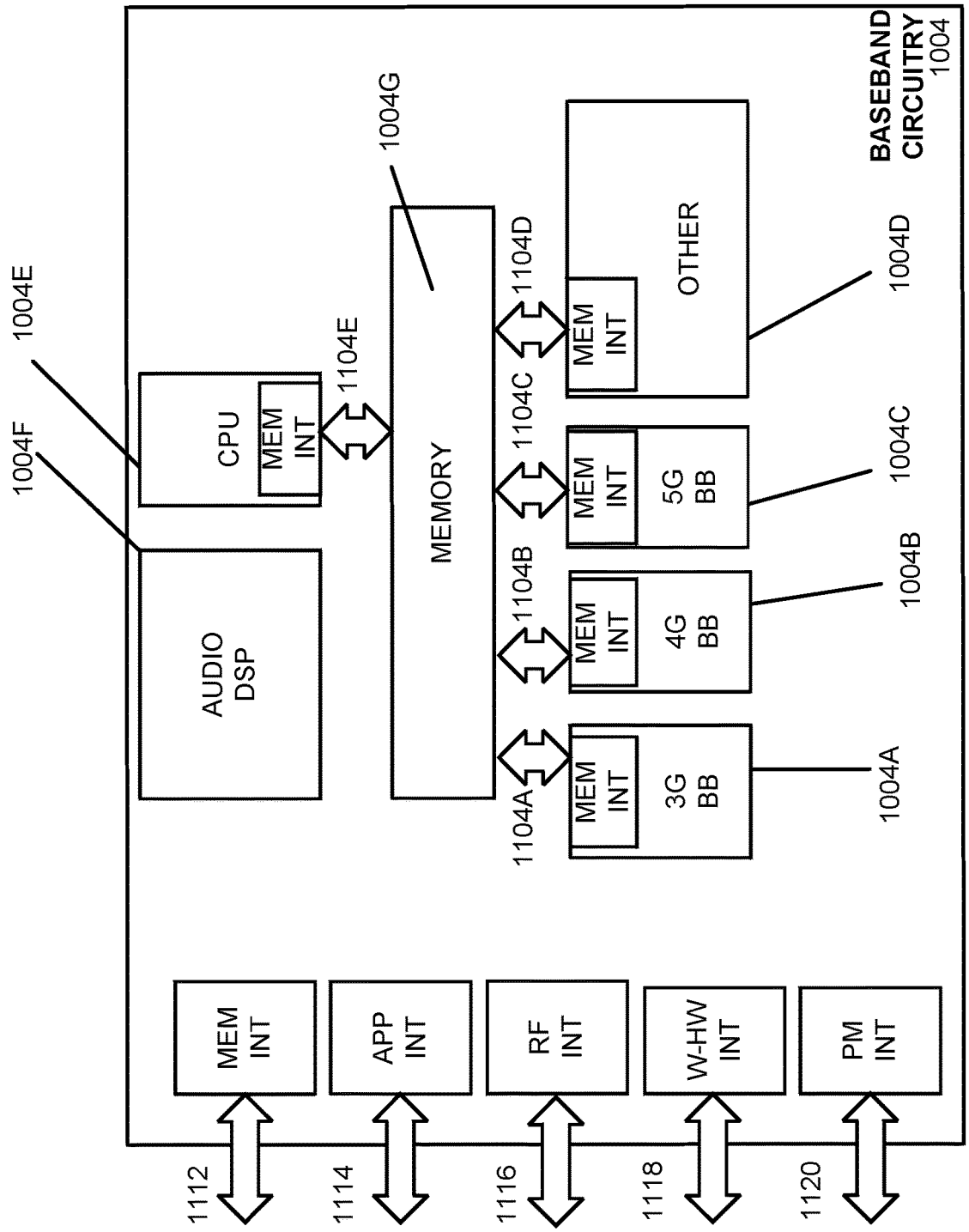
FIG. 11 illustrates interfaces of baseband circuitry in accordance with an example.

FIG. 11 illustrates example interfaces of baseband circuitry in accordance with some embodiments. As discussed above, the baseband circuitry 1004 of FIG. 10 may comprise processors 1004a-1004e and a memory 1004g utilized by said processors. Each of the processors 1004a-1004e may include a memory interface, 1104a-1104e, respectively, to send/receive data to/from the memory 1004g.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor).

The wireless modem can, in one example, modulate signals that the wireless device transmits via the one or more antennas and demodulate signals that the wireless device receives via the one or more antennas.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable for quasi-co-location (QCL), the apparatus comprising: one or more processors configured to: demodulate at the UE, a synchronization signal (SS) block transmitted by a next generation node B (gNB) from a first antenna port, wherein one or more of a Doppler shift, a Doppler spread, an average delay, a delay spread or spatial receiving parameters are derived from the SS block; decode, at the UE, a QCL indication, wherein the QCL indication provides an assumption of QCL between a first reference signal of the first antenna port and a second reference signal of a second antenna port, wherein the second antenna port is used to transmit a physical channel or a reference signal; demodulate, at the UE, the physical channel or the reference signal transmitted by the gNB from the second antenna port, using one or more of the Doppler shift, the Doppler spread, the average delay, the delay spread, or the spatial receiving parameters based on the assumption of QCL; and a memory interface configured to send the one or more of the Doppler shift, the Doppler spread, the average delay, the delay spread or the spatial receiving parameters to a memory.

Example 2 includes the apparatus of Example 1, wherein the one or more processors are further configured to: decode, at the UE, a secondary synchronization signal transmitted by the gNB from the first antenna port used to transmit the SS block; decode, at the UE, control information transmitted on a physical broadcast channel (PBCH) by the gNB from the first antenna port used to transmit the SS block; or decode, at the UE, a primary synchronization signal (PSS) transmitted by the gNB from the first antenna port used to transmit the SS block.

Example 3 includes the apparatus of Example 1, wherein the one or more processors are further configured to: decode, at the UE, common control information transmitted by the gNB in a physical channel from the second antenna port; decode, at the UE, channel state information reference signal (CSI-RS) used for beam management or beam refinement transmitted by the gNB from the second antenna port; or decode, at the UE, channel state information reference signal (CSI-RS) used for channel state information (CSI) acquisition, wherein the CSI-RS is transmitted by the gNB from the second antenna port.

Example 4 includes the apparatus of any of Examples 1 to 3, wherein the second antenna port comprises a set of antenna ports.

Example 5 includes the apparatus of any of Examples 1 to 3, wherein the UE includes an antenna, a touch sensitive display screen, a speaker, a microphone, a graphics processor, an application processor, an internal memory, a non-volatile memory port, or combinations thereof.

Example 6 includes the apparatus of Example 1, wherein the one or more processors are further configured to: determine, at the UE, a receive beamforming for receiving the synchronization signal (SS) block transmitted by the gNB from the first antenna port; and demodulate the channel state information reference signal (CSI-RS) transmitted by the gNB from the second antenna port based on the QCL assumption between the first antenna port and a second antenna port.

Example 7 includes the apparatus of Example 1, wherein the one or more processors are further configured to: select, at the UE, a same receive beamforming to receive a signal transmitted from the second antenna port, as the receive beamforming that is used to receive the SS block that is transmitted from the first antenna port; or determine, at the UE, that the signal transmitted from the second antenna port has a same time and frequency offset as a time and frequency offset derived from the received SS block transmitted from the first antenna port.

Example 8 includes the apparatus of Example 1, wherein the spatial receiving parameters include one or more of: a mean angle of arrival; an angle of arrival spread, or a channel correlation.

Example 9 includes an apparatus of a user equipment (UE) operable for quasi-co-location (QCL) for antenna ports, the apparatus comprising: one or more processors configured to: decode, at the UE, a first reference signal transmitted in a first bandwidth part (BWP) by a next generation node B (gNB) from a first set of antenna ports; decode, at the UE, a second reference signal transmitted in a second BWP by the gNB from a second set of antenna ports; and decode, at the UE, a QCL indication, wherein the QCL indication provides a QCL assumption between the first set of antenna ports and the second set of antenna ports, wherein the QCL indication is based on a type of reference signals received in the first BWP from the first set of antenna ports and the second BWP from the second set of antenna ports; and a memory interface configured to send the QCL indication to a memory.

Example 10 includes the apparatus of Example 9, wherein the one or more processors are further configured to: decode, at the UE, the QCL indication for the first reference signal and the second reference signal, wherein: the first reference signal is a channel state information reference signal (CSI-RS) transmitted from the gNB in the first BWP from the first set of antenna ports; and the second reference signal is a demodulation reference signal (DM-RS) transmitted from the gNB in the second BWP from the second set of antenna ports.

Example 11 includes the apparatus of Example 9, wherein the one or more processors are further configured to: decode, at the UE, the QCL indication for the first reference signal and the second reference signal, wherein: the first reference signal is a channel state information reference signal (CSI-RS) transmitted from the gNB in the first BWP from the first set of antenna ports; and the second reference signal is a channel state information reference signal (CSI-RS) transmitted from the gNB in the second BWP from the second set of antenna ports.

Example 12 includes the apparatus of Example 9, wherein the one or more processors are further configured to: decode, at the UE, the QCL indication for the first reference signal and the second reference signal, wherein: the first reference signal is a synchronization signal (SS) block transmitted from the gNB in the first BWP from the first set of antenna ports; and the second reference signal is a channel state information reference signal (CSI-RS) transmitted from the gNB in the second BWP from the second set of antenna ports.

Example 13 includes the apparatus of Example 9, wherein the one or more processors are further configured to: decode, at the UE, the QCL indication for the first reference signal and the second reference signal, wherein: the first reference signal is a channel state information reference signal (CSI-RS) configured for beam management or a synchronization signal (SS) block configured for beam management transmitted from the gNB in the first BWP from the first set of antenna ports; and the second reference signal is a demodulation reference signal (DM-RS) transmitted from the gNB in the second BWP from the second set of antenna ports.

Example 14 includes the apparatus of any of Examples 10 or 13, wherein the DM-RS is transmitted on a physical downlink shared channel (PDSCH) or a physical downlink control channel (PDCCH).

Example 15 includes the apparatus of any of Examples 9 to 13, wherein the one or more processors are further configured to: demodulate, at the UE, the second reference signal transmitted from the second set of antenna ports using large-scale channel parameters, wherein the large-scale channel parameters include one or more of: a Doppler shift, a Doppler spread, an average delay, a delay spread, or spatial receiving parameters.

Example 16 includes the apparatus of Example 15, wherein the spatial receiving parameters include one or more of: a mean angle of arrival, an angle of arrival spread, or a channel correlation.

Example 17 includes an apparatus of a next generation node B (gNB) configured to transmit in bandwidth parts (BWPs), the apparatus comprising: one or more processors configured to: determine, at the gNB, a first reference signal type to transmit in a first BWP from a first antenna port to a user equipment (UE); determine, at the gNB, a second reference signal type to transmit in a second BWP from a second antenna port to the UE; select, at the gNB, a quasi-co-location (QCL) indication for a first reference signal transmitted from the first antenna port and a second reference signal transmitted from the second antenna port, wherein the QCL indication provides a QCL assumption based on the first reference signal type in the first BWP for the first antenna port and the second reference type in the second BWP for the second antenna port; and encode, at the gNB, the QCL indication for transmission to the UE; and a memory interface configured to send the QCL indication to a memory.

Example 18 includes the apparatus of Example 17, wherein the one or more processors are further configured to: determine, at the gNB, that the first reference signal type to transmit in the first BWP from the first antenna port is a demodulation reference signal (DM-RS) for physical downlink shared channel (PDSCH) or physical downlink control channel (PDCCH); and determine, at the gNB, that the second reference signal type to transmit in the second BWP from the second antenna port is a CSI-RS configured for beam management or a synchronization signal (SS) block configured for beam management.

Example 19 includes the apparatus of Example 17, wherein the one or more processors are further configured to: determine, at the gNB, that the first reference signal type to transmit in the first BWP from the first antenna port is a demodulation reference signal (DM-RS); and determine, at the gNB, that the second reference signal type to transmit in the second BWP from the second antenna port is a channel state information reference signal (CSI-RS) or synchronization signal (SS) block.

Example 20 includes the apparatus of Example 17, wherein the one or more processors are further configured to: determine, at the gNB, that the reference signal type to transmit in the first BWP from the first antenna port is a channel state information reference signal (CSI-RS); and determine, at the gNB, that the reference signal type to transmit in the second BWP from the second antenna port is a CSI-RS and synchronization signal (SS) block.

Example 21 includes the apparatus of any of Examples 17 to 20, wherein the first antenna port comprises a set of antenna ports.

Example 22 includes the apparatus of any of Examples 17 to 20, wherein the second antenna port comprises a set of antenna ports.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to receive information from antenna ports that are quasi co-located, the apparatus comprising:
one or more baseband processors configured to:
demodulate, at the UE, a synchronization signal (SS) block (SSB) transmitted by a base station from a first antenna port, wherein one or more of a Doppler shift, a Doppler spread, an average delay, a delay spread or spatial receiving parameters are derived from the SSB;
decode, at the UE, a quasi co-location (QCL) indication, wherein the QCL indication provides an assumption of QCL between a first reference signal transmitted by the base station from the first antenna port and a second reference signal transmitted by the base station from a second antenna port, wherein the second antenna port transmits the second reference signal on a physical channel;
select, at the UE, a same receive beamforming to receive the second reference signal that is transmitted from the second antenna port, as a receive beamforming that is used to receive the SSB that is transmitted from the first antenna port; and
demodulate, at the UE, the second reference signal using one or more of the Doppler shift, the Doppler spread, the average delay, the delay spread, or the spatial receiving parameters based on the assumption of QCL; and
a memory interface configured to send one or more of the Doppler shift, the Doppler spread, the average delay, the delay spread, or the spatial receiving parameters to a memory.

2. The apparatus of claim 1, wherein the one or more baseband processors are further configured to:
decode, at the UE, common control information transmitted by the base station in a physical channel from the second antenna port;
decode, at the UE, channel state information reference signal (CSI-RS) used for beam management or beam refinement transmitted by the base station from the second antenna port; or
decode, at the UE, channel state information reference signal (CSI-RS) used for channel state information (CSI), wherein the CSI-RS is transmitted by the base station from the second antenna port.

3. The apparatus of claim 1, wherein the second antenna port comprises a set of antenna ports.

4. The apparatus of claim 1, wherein the UE includes an antenna, a touch sensitive display screen, a speaker, a microphone, a graphics processor, an application processor, an internal memory, a non-volatile memory port, or combinations thereof.

5. The apparatus of claim 1,
wherein the second reference signal comprises a channel state information reference signal (CSI-RS).

6. The apparatus of claim 1, wherein the one or more baseband processors are further configured to
determine, at the UE, that the signal transmitted from the second antenna port has a same time and frequency offset as a time and frequency offset derived from the received SSB transmitted from the first antenna port.

7. The apparatus of claim 1, wherein the spatial receiving parameters include one or more of:

a mean angle of arrival,
an angle of arrival spread, or
a channel correlation.

8. An apparatus of a user equipment (UE) operable to receive information from antenna ports that are quasi co-located, the apparatus comprising:
one or more baseband processors configured to:
demodulate, at the UE, a first reference signal transmitted in a first bandwidth part (BWP) by base station from a first set of antenna ports;
demodulate, at the UE, a second reference signal transmitted in a second BWP by the base station from a second set of antenna ports; and
decode, at the UE, a quasi co-location (QCL) indication, wherein the QCL indication provides a QCL assumption between the first set of antenna ports and the second set of antenna ports, wherein the QCL indication indicates a QCL type for the first reference signal received in the first BWP from the first set of antenna ports and the QCL type for the second reference signal received in the second BWP from the second set of antenna ports; and
a memory interface configured to send the QCL indication to a memory.

9. The apparatus of claim 8, wherein the one or more baseband processors are further configured to:
decode, at the UE, the QCL indication for the first reference signal and the second reference signal, wherein:
the first reference signal is a channel state information reference signal (CSI-RS) received from the base station in the first BWP from the first set of antenna ports; and
the second reference signal is a demodulation reference signal (DM-RS) received from the base station in the second BWP from the second set of antenna ports.

10. The apparatus of claim 9, wherein the DM-RS is transmitted on a physical downlink shared channel (PDSCH) or a physical downlink control channel (PDCCH).

11. The apparatus of claim 8, wherein the one or more baseband processors are further configured to:
decode, at the UE, the QCL indication for the first reference signal and the second reference signal, wherein:
the first reference signal is a channel state information reference signal (CSI-RS) received from the base station in the first BWP from the first set of antenna ports; and
the second reference signal is a channel state information reference signal (CSI-RS) received from the base station in the second BWP from the second set of antenna ports.

12. The apparatus of claim 8, wherein the one or more baseband processors are further configured to:
decode, at the UE, the QCL indication for the first reference signal and the second reference signal, wherein:
the first reference signal is a synchronization signal (SS) block received from the base station in the first BWP from the first set of antenna ports; and
the second reference signal is a channel state information reference signal (CSI-RS) received from the base station in the second BWP from the second set of antenna ports.

13. The apparatus of claim 8, wherein the one or more baseband processors are further configured to:

decode, at the UE, the QCL indication for the first reference signal and the second reference signal, wherein:
the first reference signal is a channel state information reference signal (CSI-RS) configured for beam management or a synchronization signal (SS) block received from the base station in the first BWP from the first set of antenna ports; and
the second reference signal is a demodulation reference signal (DM-RS) received from the base station in the second BWP from the second set of antenna ports.

14. The apparatus of claim 8, wherein the one or more baseband processors are further configured to:
demodulate, at the UE, the second reference signal transmitted from the second set of antenna ports using large-scale channel parameters, wherein the large-scale channel parameters include one or more of:
a Doppler shift,
a Doppler spread,
an average delay,
a delay spread, or
spatial receiving parameters.

15. The apparatus of claim 14, wherein the spatial receiving parameters include one or more of:
a mean angle of arrival,
an angle of arrival spread, or
a channel correlation.

16. An apparatus base station operable to transmit in bandwidth parts (BWPs), the apparatus comprising:
one or more baseband processors configured to:
determine, at the base station, a first reference signal type to transmit in a first BWP from a first antenna port to a user equipment (UE);
determine, at the base station, a second reference signal type to transmit in a second BWP from a second antenna port to the UE;
select, at the base station, a quasi-co-location (QCL) indication for a first reference signal transmitted from the first antenna port and a second reference signal transmitted from the second antenna port, wherein the QCL indication indicates a QCL type for the first reference signal type of the first reference signal transmitted in the first BWP from the first antenna port and the QCL type for the second reference type of the second reference signal transmitted in the second BWP from the second antenna port; and
encode, at the base station, the QCL indication for transmission to the UE; and
a memory interface configured to send the QCL indication to a memory.

17. The apparatus of claim 16, wherein the one or more baseband processors are further configured to:
determine, at the base station, that the first reference signal type to transmit in the first BWP from the first antenna port is a demodulation reference signal (DM-RS) for physical downlink shared channel (PDSCH) or physical downlink control channel (PDCCH); and
determine, at the base station, that the second reference signal type to transmit in the second BWP from the second antenna port is a channel state information reference signal (CSI-RS) configured for beam management or a synchronization signal (SS) block.

18. The apparatus of claim 16, wherein the one or more baseband processors are further configured to:

determine, at the base station, that the first reference signal type to transmit in the first BWP from the first antenna port is a demodulation reference signal (DM-RS); and determine, at the base station, that the second reference signal type to transmit in the second BWP from the second antenna port is a channel state information reference signal (CSI-RS) or synchronization signal (SS) block.

19. The apparatus of claim 16, wherein the one or more baseband processors are further configured to:

determine, at the base station, that the first reference signal type to transmit in the first BWP from the first antenna port is a channel state information reference signal (CSI-RS); and determine, at the base station, that the second reference signal type to transmit in the second BWP from the second antenna port is a CSI-RS or a synchronization signal (SS) block.

20. The apparatus of claim 16, wherein the first antenna port comprises a set of antenna ports.

21. The apparatus of claim 16, wherein the second antenna port comprises a set of antenna ports.

* * * * *